United States Patent [19]
Freluche

[11] Patent Number: 4,802,275
[45] Date of Patent: Feb. 7, 1989

[54] METHOD OF MANUFACTURING AN ELECTROCHEMICAL CELL HAVING AN ALKALINE ELECTROLYTE AND SPIRAL-WOUND ELECTRODES

[75] Inventor: Jean-Pierre Freluche, Angouleme, France

[73] Assignee: Saft, S.A., Romainville, France

[21] Appl. No.: 163,831

[22] Filed: Mar. 3, 1988

[30] Foreign Application Priority Data

Mar. 12, 1987 [FR] France .................. 87 03391

[51] Int. Cl.$^4$ ............ H01M 4/26; H01M 10/28
[52] U.S. Cl. .................. 29/623.4; 429/94
[58] Field of Search ........... 429/94; 29/623.1, 623.3, 29/623.4

[56] References Cited

FOREIGN PATENT DOCUMENTS 3543446 6/1987 Fed. Rep. of Germany .
0007072 1/1985 Japan ........................ 429/94
0180070 9/1985 Japan ........................ 29/623.1
0000229 3/1979 PCT Int'l Appl. ............ 429/94

Primary Examiner—Donald L. Walton
Attorney, Agent, or Firm—Kenyon & Kenyon

[57] ABSTRACT

A method of manufacturing an electrochemical cell having an alkaline electrolyte and spiral-wound electrodes, the method consisting in superposing four items: a positive electrode (2), a separator (4), a negative electrode (3), and another separator (5), with the two separators optionally being two lengths of a common separator; in winding these four items around a core (13) in order to obtain a roll (10); and in inserting said roll in the can (11) of the cell. The method includes the improvement whereby, at the end of the winding operation, the end of one of the elements is fixed on the preceding turn of the same element by means of a hot melt glue which is not soluble in said alkaline electrolyte.

5 Claims, 3 Drawing Sheets

METHOD OF MANUFACTURING AN ELECTROCHEMICAL CELL HAVING AN ALKALINE ELECTROLYTE AND SPIRAL-WOUND ELECTRODES

The present invention relates to a method of manufacturing an electrochemical cell having an alkaline electrolyte and spiral-wound electrodes, for example a nickel-cadmium storage cell.

BACKGROUND OF THE INVENTION

The method consists in superposing a positive electrode, a separator, a negative electrode, and another separator, with the two separators possibly being two lengths of a common separator, in winding these items around a core thus obtaining a roll, and then inserting the spool in a can which is to constitute the negative terminal of the cell.

At the end of the winding operation, the turns of the roll must be prevented from slackening off too much, so as to be able to insert the roll in the cam.

A first prior method consists in binding the roll at the end of the winding operation by means of adhesive tape, for example, and then inserting the bound spool into the can. The major drawback of this method lies in the face that the binding remains permanently in the cell and cannot be removed.

In U.S. Pat. No. 4,099,401, the last turn of the winding is fixed to the previous turn by means of a two-faced adhesive tape. All techniques relying on adhesive tape bonding suffer from intrinsic drawbacks. Firstly it is necessary to periodically stop the winding machine in order to load a new spool of adhesive tape. Secondly, the operation of applying adhesive tape is unreliable since the tape may kink, stick to itself, stick to various parts of the machine, etc. . . . .

In addition, such an implementation which requires an operation of unwinding the adhesive tape, then a cutting operation, and then the application of a piece of tape, is incompatible with a high speed roll manufacturing rate, e.g. less than one second per roll.

A second prior method which makes it possible to omit the binding, consists in inserting the roll, after it has been wound, into a transfer ring, and then moving the ring close to the can prior to inserting the roll into the can, with the portion of the roll that is not yet inserted in the can being held by the ring. This method makes it possible to insert a roll directly into a can, but the use of such a ring after winding the roll constitutes an additional operation which requires considerable equipment.

In a third method described in U.S. Pat. No. 4,402,784, heat welding members come into contact, at the end of winding, with the outer surface of the roll in order to bond the last turn of the separator to the prior turn. This method also suffers from several drawbacks. Each welding operation requires a machine stop time, and a separator strip melting time which lasts substantially in the range 0.4 seconds to 1 second. This greatly penalizes the operating rate. Further, it is necessary to provide access for a welding tool to the center of the winding machine which is extremely difficult because of the presence of members for holding the roll. Further, it is essential for the various items to be at an accurate angle in order to perform hot welding repetitively. Finally, there is a risk of the separator sticking to the welding electrodes.

The method of the present invention avoids binding while also avoiding an additional operation after winding which could slow down the manufacturing process.

This method also prevents the turns from relaxing prior to insertion into the can, and provides a choice between releasing or not releasing the turns after they have been inserted, depending on whether a power cell or an energy cell is to be obtained.

SUMMARY OF THE INVENTION

The present invention provides a method of manufacturing an electrochemical cell having an alkaline electrolyte and spiral-wound electrodes, the method consisting:

in superposing four items: a positive electrode, a separator, a negative electrode, and another separator, with the two separators optionally being two lengths of a common separator;

in winding these four items around a core in order to obtain a roll; and in inserting said roll in the can of the cell;

the method including the improvement whereby, at the end of the winding operation, the end of one of the elements is fixed on the preceding turn of the same element by means of a hot melt glue which is not soluble in said alkaline electrolyte.

This hot melt glue does not contain natural or synthetic resins, but does contain a mixture of polyolefin wax and a polyolefin copolymer.

In a first embodiment, a separator is fixed to itself and the fixing means is retained after insertion into the can, which mode is particularly suitable for a power cell.

In a second embodiment, the negative electrode is fixed to itself and the fixing means is removed after insertion into the can, thereby providing good contact between the negative electrode and the can, which mode is particularly suitable for an energy cell.

BRIEF DESCRIPTION OF THE DRAWINGS

A manufacturing method in accordance with the invention is described below by way of example and with reference to the accompanying drawings.

MORE DETAILED DESCRIPTION

Figure 1:
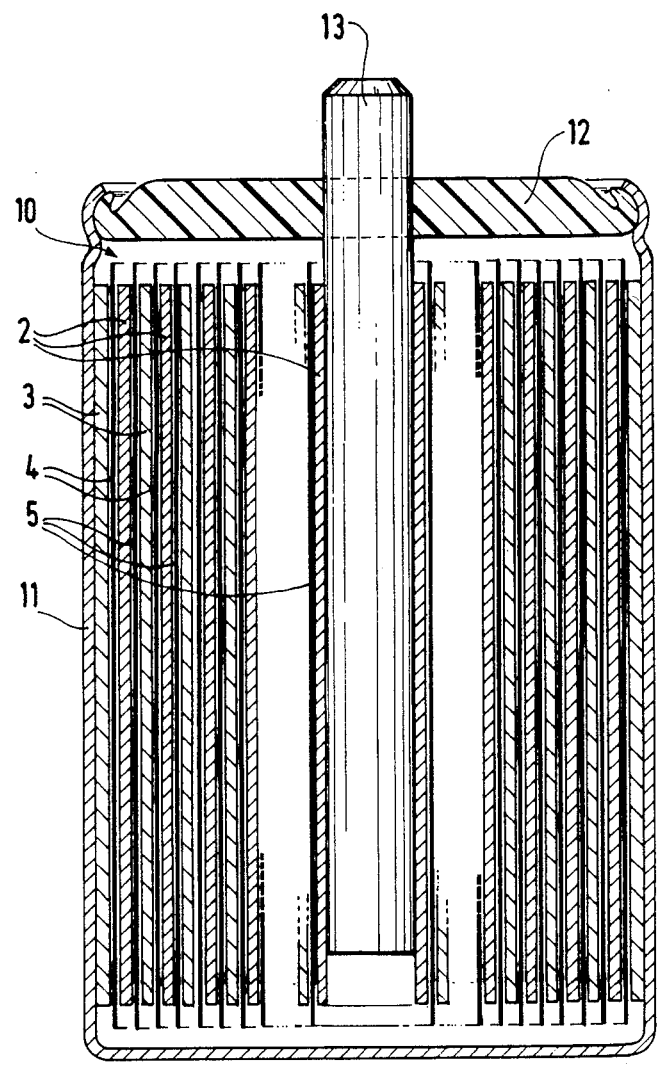
FIG. 1 shows an electrochemical cell having spiral-wound electrodes.

The FIG. 1 cell comprises a cylindrical can 11 containing a roll 10 wound around a core 13, said can being closed by a cover 12. The passage of the core 13 through the cover 12 is shown diagrammatically in this case.

The roll 10 comprises a positive electrode 2, a separator 4, a negative electrode 3, and finally another separator 5. In order to obtain the disposition of these four items as shown in the figure, it is naturally necessary to stack these items flat in the above-described order, and then wind them about the core 13, with the positive electrode being wound onto the core 13. This winding process is clearly visible in FIG. 2 from which it can be seen that the two electrodes are permanently separated by one or other of the separators.

Figure 2:
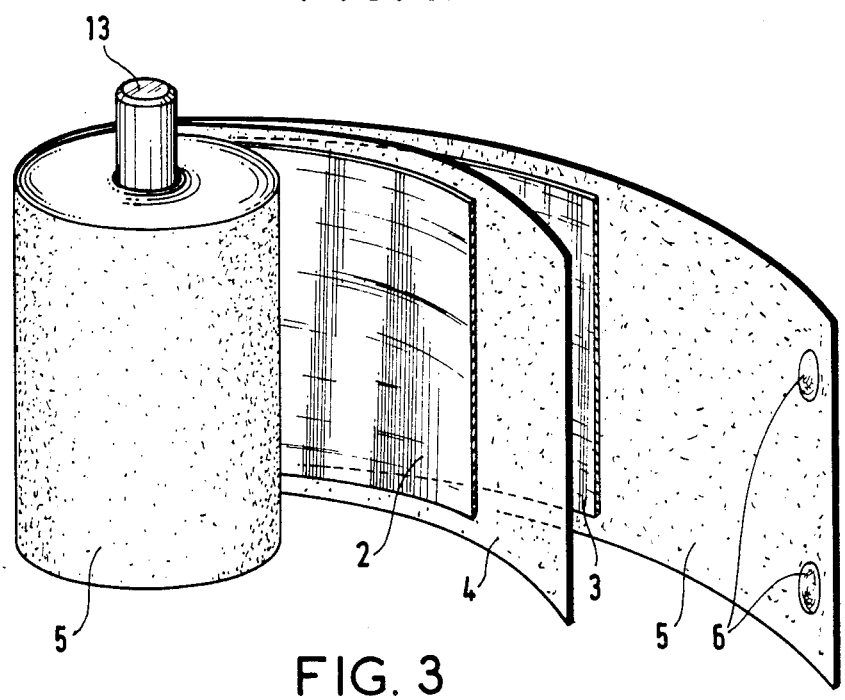
FIG. 2 shows a first implementation of the method of the invention.

FIG. 2 shows the core 13 and the ends of the four wound items, i.e. the positive electrode 2, the separator 4, the negative electrode 3, and the separator 5 which constitutes the last turn.

Two fixing means 6 such as two points of hot melt glue which is not soluble in an alkaline electrolyte such as potassium hydroxide, are placed on the inside face of the separator 5, and winding the items fully will cause the end of the separator 5 which is slightly longer than the other items to come into contact with itself so that the fixing means 6 then prevent the turns from unwinding.

For example, the hot melt glue used does not include natural or synthetic resins, but does comprise a mixture of polyolefin wax and a polyolefin copolymer. The solubility of a sample of such a hot melt glue when immersed in an 8.7 N alkaline electrolyte at 70° C. for seven days should be less than 2% by weight.

Figure 3:
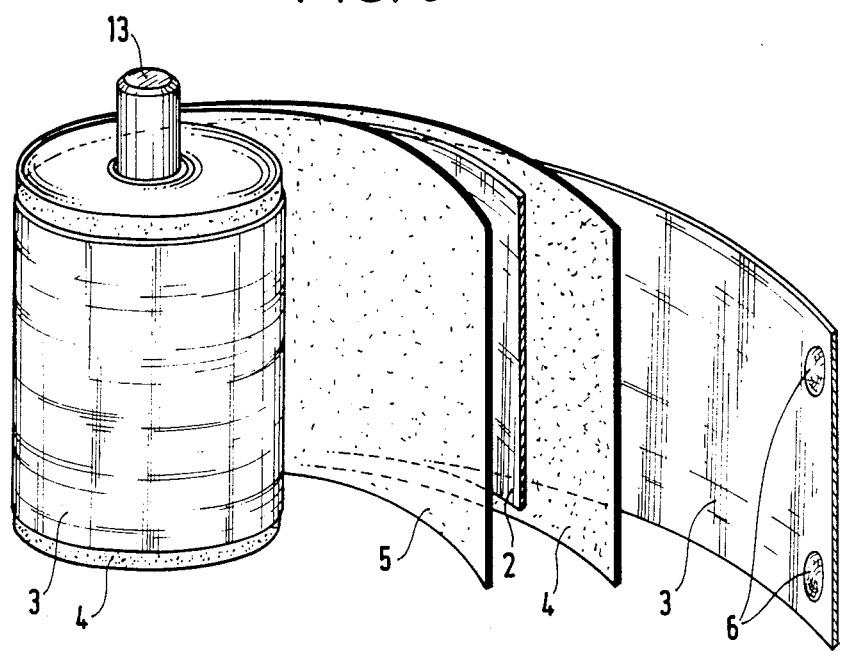
FIG. 3 shows a second implementation of the method of the invention.

In FIG. 3, it is the negative electrode 3 which constitutes the outer item, and this may be obtained by providing a separator 5 which is shorter by about one turn. When the roll is fully wound, the last turn of the negative electrode 3 comes into contact with itself and the fixing means prevent the turns from unwinding.

Regardless of which implementation is used, the method of the invention takes place as follows:

all four items are superposed using lengths suitable for performing the first implementation or the second implementation;

the fixing means 6 is placed at the end of the separator 5 of the negative electrode 3;

the items are wound around the core 13 until the last turn has been fixed to itself; and the roll formed in this way is inserted in the can 11.

Figure 4:
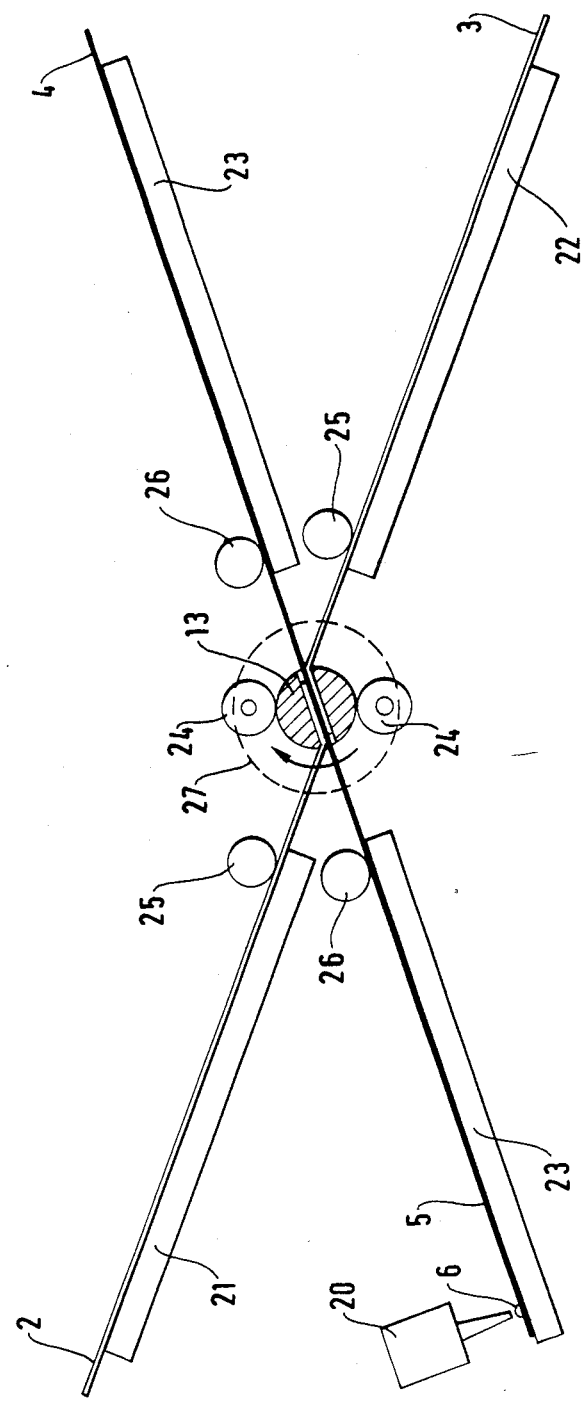
FIG. 4 is a highly diagrammatic view of an installation for implementing the method in accordance with the invention.

FIG. 4 is a highly diamgrammatic view of an installation for winding the turns and for putting the hot melt glue into place.

The figure shows the core 13, a guide 21 for the positive electrode 2, a guide 22 for the negative electrode 3, and guides 23 for the separators 4 and 5. References 24, 25, and 26 correspond to presser wheels acting respectively on the roll 27 as it is formed, on the electrodes 2 and 3, and on the separators 4 and 5.

The hot melt glue dispenser 20 is situated outside the winding zone per se. It does not get in the way, whereas a hot welding device must be in the immediate proximity of the roll 27.

The dispenser squirts a small qantity 6 of hot melt glue into the separator 5 and therefore does not come into direct contact therewith. This operation can be performed during pressure wheel advance, before the winding operation per se, i.e. it does not require any increase in cycle time, nor does it require the roll to be stopped at an accurate position once it has been wound.

In the first implementation which is suitable for a power cell, the fixing means 6 is left intact such that the interelectrode distance remains constant. This provides improved current density and the fact that the roll does not relax means that a greater length of electrode may be wound onto the roll.

In the second implementation, which is suitable for an energy cell, the fixing means 6 is destroyed by an appropriate method (mechanical, thermal, chemical) such that the turns relax and, in particular, the last turn of the negative electrode presses against the inside face of the can.

I claim:

1. A method of manufacturing an electrochemical cell having an alkaline electrolyte and spiral-wound electrodes, the method consisting:

in superposing four items: a positive electrode, a separator, a negative electrode, and another separator, with the two separators optionally between two lengths of a common separator;

in winding these four items around a core in order to obtain a roll; and in inserting said roll in the can of the cell; the method including the improvement whereby, at the end of the winding operation, the end of one of the elements is fixed on the preceding turn of the same element by means of a hot melt glue which is not soluble in said alkaline electrolyte.

2. A method according to claim 1, in which it is one of the separators that is fixed to itself.

3. A method according to claim 2, wherein the fixing means are kept in place after the roll has been inserted into the can.

4. A method according to claim 1, in which it is the negative electrode which is fixed to itself.

5. A method according to claim 4, wherein the fixing means is removed after the roll has been inserted in the can in order to provide good contract between the negative electrode and the inside face of the can.

* * * * *